United States Patent
Dohmann et al.

(10) Patent No.: US 12,318,957 B2
(45) Date of Patent: Jun. 3, 2025

(54) DEVICE AND METHOD FOR CUTTING AN EXTRUDED PIPE TO LENGTH

(71) Applicant: BATTENFELD-CINCINNATI GERMANY GMBH, Bad Oeynhausen (DE)

(72) Inventors: Heinrich Dohmann, Hoexter (DE); Joerg Droege, Kerken (DE); Tobias Hus, Luebbecke (DE)

(73) Assignee: BATTENFELD-CINCINNATI GERMANY GMBH, Bad Oeynhausen (DE)

(*) Notice: Subject to any disclaimer, the term of this patent is extended or adjusted under 35 U.S.C. 154(b) by 757 days.

(21) Appl. No.: 17/251,817

(22) PCT Filed: Jun. 10, 2019

(86) PCT No.: PCT/EP2019/065078
§ 371 (c)(1),
(2) Date: Dec. 14, 2020

(87) PCT Pub. No.: WO2019/238609
PCT Pub. Date: Dec. 19, 2019

(65) Prior Publication Data
US 2021/0114244 A1    Apr. 22, 2021

(30) Foreign Application Priority Data

Jun. 15, 2018 (DE) .................. 10 2018 114 472.5
Jun. 15, 2018 (DE) .................. 10 2018 114 473.3
Jun. 15, 2018 (DE) .................. 10 2018 114 474.1

(51) Int. Cl.
*B26D 3/16* (2006.01)
*B29C 48/00* (2019.01)
(Continued)

(52) U.S. Cl.
CPC ............ *B26D 3/166* (2013.01); *B26D 3/16* (2013.01); *B29C 48/0022* (2019.02);
(Continued)

(58) Field of Classification Search
CPC . B26D 3/166; B26D 3/16; B26D 3/26; B26D 5/086; B26D 1/60; B29C 48/0022; B29C 48/09; B29C 48/90; B29L 48/0022
(Continued)

(56) References Cited

U.S. PATENT DOCUMENTS 5,012,579 A * 5/1991 Matsumoto .............. B26D 3/16 30/92
2017/0021435 A1* 1/2017 Parks .................. B23D 35/001
2017/0259357 A1* 9/2017 Choi ........................ B23B 3/265

FOREIGN PATENT DOCUMENTS

CN         1821620 A  *  8/2006
CN       102407378 A     4/2012
(Continued)

OTHER PUBLICATIONS

Translation, CN 1821620 (Year: 2024).*
KR-101407327-B1, Translation (Year: 2025).*
WO-2015141998-A1. Translation (Year: 2025).*

*Primary Examiner* — Nhat Chieu Q Do
(74) *Attorney, Agent, or Firm* — LEYDIG, VOIT & MAYER, LTD.

(57) ABSTRACT

A separating device cuts an extruded pipe to length. The separating device has a separator that is rotatably mounted and rotates about an extrusion axis. Cutting tools are arranged on the separator and move in accordance with received energy. An electromechanical drive can move a carrier that supports a cutting tool. The electromechanical drive and the carrier are on a rotating receiver of the separator. An element for energy transfer is connected to a moving part of the rotating receiver, the element being (Continued)

coupled to an energy supplier arranged on the rotating receiver. The energy and control commands are transmitted to the electromechanical drive via the element for energy transfer and the energy supplier. The electromechanical drive, the carrier, or the cutting tool can yield to a force counter to a separating force if that force is greater than a required separating force for cutting the extruded pipe.

15 Claims, 7 Drawing Sheets

(51) Int. Cl.
  *B29C 48/09* (2019.01)
  *B29C 48/90* (2019.01)
  *B29L 23/00* (2006.01)
(52) U.S. Cl.
  CPC .............. *B29C 48/09* (2019.02); *B29C 48/90* (2019.02); *B29L 2023/22* (2013.01)

(58) Field of Classification Search
  USPC .......................................................... 83/676
  See application file for complete search history.

(56) References Cited

FOREIGN PATENT DOCUMENTS

| DE | 102013220620 A1 | | 4/2015 | | |
|----|----|----|----|----|----|
| DE | 102013220622 A1 | | 4/2015 | | |
| EP | 2907609 A2 | * | 8/2015 | ........... | B23D 45/006 |
| EP | 3130416 A1 | | 2/2017 | | |
| KR | 101266428 B1 | * | 5/2013 | | |
| KR | 101407327 B1 | * | 12/2013 | | |
| WO | WO 2014153925 A1 | | 10/2014 | | |
| WO | WO-2015141998 A1 | * | 9/2015 | ............... | B23B 3/26 |

\* cited by examiner

DEVICE AND METHOD FOR CUTTING AN EXTRUDED PIPE TO LENGTH

CROSS-REFERENCE TO PRIOR APPLICATIONS

This application is a U.S. National Phase Application under 35 U.S.C. § 371 of International Application No. PCT/EP2019/065078, filed on Jun. 10, 2019, and claims benefit to German Patent Applications No. DE 10 2018 114 472.5, filed on Jun. 15, 2018, No. DE 10 2018 114 473.3, filed on Jun. 15, 2018, and No. DE 10 2018 114 474.1, filed on Jun. 15, 2018. The International Application was published in German on Dec. 19, 2019, as WO 2019/238609 A1 under PCT Article 21(2).

FIELD

The present invention relates to a device for cutting an extruded plastic pipe to length by means of a separating device and a separating unit that can be rotated about the extrusion axis of the extruded pipe.

BACKGROUND

DE 102013220620 A1, for example, describes a device for cutting a preferably thick-walled extruded pipe to length, having at least one separating tool and a receiving unit for the separating tool. The separating tool can be moved radially with respect to the extrusion axis and can be rotated by further means around the pipe to be cut to length in order to cut the pipe to length. Here, it is envisaged that the separating tool is operatively connected to a ring element, and the ring element can be moved by means of an axial drive, and the penetration depth of the separating tool and the travel can be determined by means of an adjusting unit.

To adjust the separating unit and ascertain the positions of the separating device, a multiplicity of sensors and control elements is required, and electric energy must furthermore be converted into hydraulic energy to actuate a drive.

SUMMARY

An embodiment of the present invention provides a separating device that cuts an extruded pipe to length. The separating device has a separator is rotatably mounted and rotates about an extrusion axis of the extruded pipe, cutting tools arranged on the separator, the cutting tools being configured to perform the cutting of the extruded pipe, the cutting tools being configured to move in accordance with received energy, a rotating receiver arranged in the separator, an electromechanical drive that is configured to move a carrier, a cutting tool of the cutting tools being coupled to the carrier, the electromechanical drive and the carrier being arranged on the rotating receiver, and an element for energy transfer operatively connected to a moving part of the rotating receiver, the element for energy transfer being operatively coupled to an energy supplier arranged on the rotating receiver. The energy and control commands are configured to be transmitted to the electromechanical drive via the element for energy transfer and the energy supplier. The electromechanical drive, the carrier, or the cutting tool are arranged in such a way to yield to a force counter to a separating force that is greater than a required separating force for cutting the extruded pipe.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the the present invention provide a drive for separating tools in which the mass of the moving part of the separating unit is significantly lower.

In an embodiment of the present invention, at least one electric component is mounted on a rotating receiving unit, via which component the energy and control commands are transmitted to at least one electromechanical unit for moving at least one carrier and a cutting tool arranged thereon. The space defined by the electromechanical unit, the carrier, and the cutting tool arranged thereon is smaller than that defined by a hydraulic unit required for the same generation of force. The electromechanical unit, the carrier, or the cutting tool are arranged in such a way that it is possible to yield to a force counter to the separating force if said force is greater than the required separating force.

The entire system is thus capable of yielding in the case of an overload in order to avoid damage. This may be necessary if there is a lack of circularity in the plastic pipe, for example.

The electromechanical unit for moving the cutting tool is advantageously a linear drive, which comprises a motor-driven spindle. However, the use of a rack with a pinion, or a toothed belt, or a magnetic field is also envisaged.

In the case of hydraulic drives, the operating temperature has an effect on the behavior of the drive and hence on the precise control of the units operated thereby. A large number of technical components is required to detect these different operating states and to respond appropriately and control them. Thus, in the case of cold oil for example, the initial position of a cylinder differs from that with heated oil. All these states must be detected by means of sensors in order to obtain optimum control, and the plant must first of all be run up to operating temperature.

In the case of the device according to the invention, all this can be omitted because all the states can already be stored by means of modern linear drives and can thus be called up at all times.

In accordance with a development, the rotating receiving unit has two surfaces. Only one of the surfaces is provided for mounting the cutting tools, and the entire power supply takes place via the surface of the rotating receiving unit on which no cutting tools are mounted.

In order to be able to yield to a force counter to the separating force if this force is greater than the required separating force, it is envisaged that the electromechanical unit, the carrier or the cutting tool is operatively connected to one or more spring elements.

Various technological solutions can be used in this context. The decisive point is whether it is possible to yield in the case of an overload in the chain of action from the electromechanical unit via the carrier and the cutting tool. If one of the elements is self-locking by nature, it is necessary to incorporate appropriate spring elements in the chain. This can be an arrangement of several diaphragm springs in a linear direction. However, it is also conceivable to use torsion springs or other elements, which develop a spring action. These can be a rack with a pinion and a torsion spring or a magnetic field in which a moving core floats, for example.

Thus, yielding is also ensured in the case of an excessive feed of the cutting tool. Thus, the system offers high flexibility in implementing the cutting or chamfering of the pipe.

Provision is also made to stop the separating process and to resume it, i.e. to allow stop and go in the feed of the cutting tool if required, and also a reverse motion back as far as the starting point. This gives rise to a kind of intermittent cutting action, thereby generating small, short chips, and a brief forward and backward motion to break the chips is also conceivable. Small chips entail little effort in cleaning and additionally less volume in terms of waste.

In the case of a device according to the invention and a method according to the invention, this can all be implemented within fractions of seconds because it is accomplished by means of electric and/or electronic signals. For reverse travel to the starting point, the time required is less than five seconds, and pure stop and go takes a maximum of two seconds. Among the reasons for this is that there is no longer any mechanical play in the components.

By means of conventional hydraulics, this would be possible only at very great expense since there would be a need to control valves and the time required for the switching processes to achieve this is many times greater.

The spring action can also be produced by means of a magnetic field in which a pin floats. A core pin is not moved by means of a self-locking thread but by means of a magnetic field and can thus yield. An electromechanical drive is likewise conceivable. A rack with a pinion, which are not self-locking in their interaction, can likewise yield to the counterpressure and can thus also manage without a spring element in the chain of action. Toothed belts etc. and other non-self-locking embodiments are also conceivable. Thus, hydraulic cylinders, which act like shock dampers, are also conceivable. Embodiments that act like expansion tanks can also be used.

Because the entire system comprising the electromechanical unit, the carrier and the cutting tool arranged thereon is smaller than a hydraulic unit required for the same generation of force, it also weighs less, and this in turn minimizes the masses to be accelerated and thus has an advantageous effect on the overall energy requirement. Of course, it is also possible to use two or more electromechanical units, which then each move a carrier with a cutting tool arranged thereon.

By means of a method according to an embodiment of the present invention, it is ensured that the applied force and the speed of movement of the electromechanical unit are largely independent of the operating temperature.

The speed of response following control commands is just as good at a temperature of −5° C. as at a temperature of +40° C. because an electric signal is processed directly and does not first have to be passed via valves—as in hydraulic systems. The plant thus does not first have to be brought to an operating temperature to ensure a reliable process.

The method, of an embodiment of the present invention, also allows a brief interruption in the separating process, thereby breaking chips. This stopping, possibly a reverse motion, and restarting or moving forward again takes place within fractions of seconds. Such cutting sequences can be stored as a master in the controller and called up again in the case of identical or similar cutting processes.

By virtue of a method according to an embodiment of the invention and a device according to an embodiment of the invention, it is also possible to arrange driven tools on the carrier. The system is thus not restricted to chipless separation. Thus, it is just as possible to use milling cutters as cutting tools as it is to use saws.

Using an intelligent tool recognition system, which can read out markings on the tool or can recognize the shape of the tool, defects or damage can be avoided by means of the controller. Through the recognition of the tool, it is also possible to call up parameters that are already stored in the controller. Thus, for example, the feed and penetration depth in the case of a chamfering tool are limited and can be directly preset by the recognition system.

Tool detection can be performed electromechanically, and it is proposed, for example, to configure both the geometrical embodiment of the coupling unit between the tool and the tool receptacle in such a way that it is possible to clearly recognize which tool has been mounted. By means of the electrics, e.g. a certain arrangement of a contact matrix, the machine controller clearly recognizes which tool has been mounted. By virtue of this recognition, it is possible for the controller to ascertain whether this tool is suitable for the process to be carried out. If this is not the case, the controller can output an alarm or even stop or refuse implementation. This check can be performed in dependence on the pipe diameter or pipe thickness, for example, and recognition in this case can be based on the inserted clamping jaws or equally well on the separating blades or merely on the cutting tools for chamfering.

A number of embodiments for marking the tool and for recognizing the mounted tool are proposed. Thus, a numerical code that is read out by a camera can be used as a marking. However, the camera can also recognize the tool by means of its shape or parts of the shape. The use of an RFID tag with a corresponding reader is also conceivable. RFID stands for radio-frequency identification and is a contactless transmitter-receiver system. Based on RFID technology, data transfer can then also take place by near field communication, abbreviated to NFC. NFC is an international transfer standard for the contactless exchange of data. However, tool recognition can also be accomplished by means of a barcode or a QR code with an associated reader, the barcode scanner or the QR scanner.

Recognizing the inserted tool is not the only possibility, however. The invention also allows the detection of the pipe diameter in production because the position of the clamping jaws that fix the pipe during cutting can be read out. This has the advantage that the travels for releasing the fixed pipe can be optimized. Neither the clamping jaws nor the cutting tools need to move back into the initial position in the case of a small pipe diameter, for example, it being sufficient to move back until the pipe, including its standard tolerances, has been released in order to be able to continue moving it past the separating unit in the extrusion direction without damage.

Figure 1:
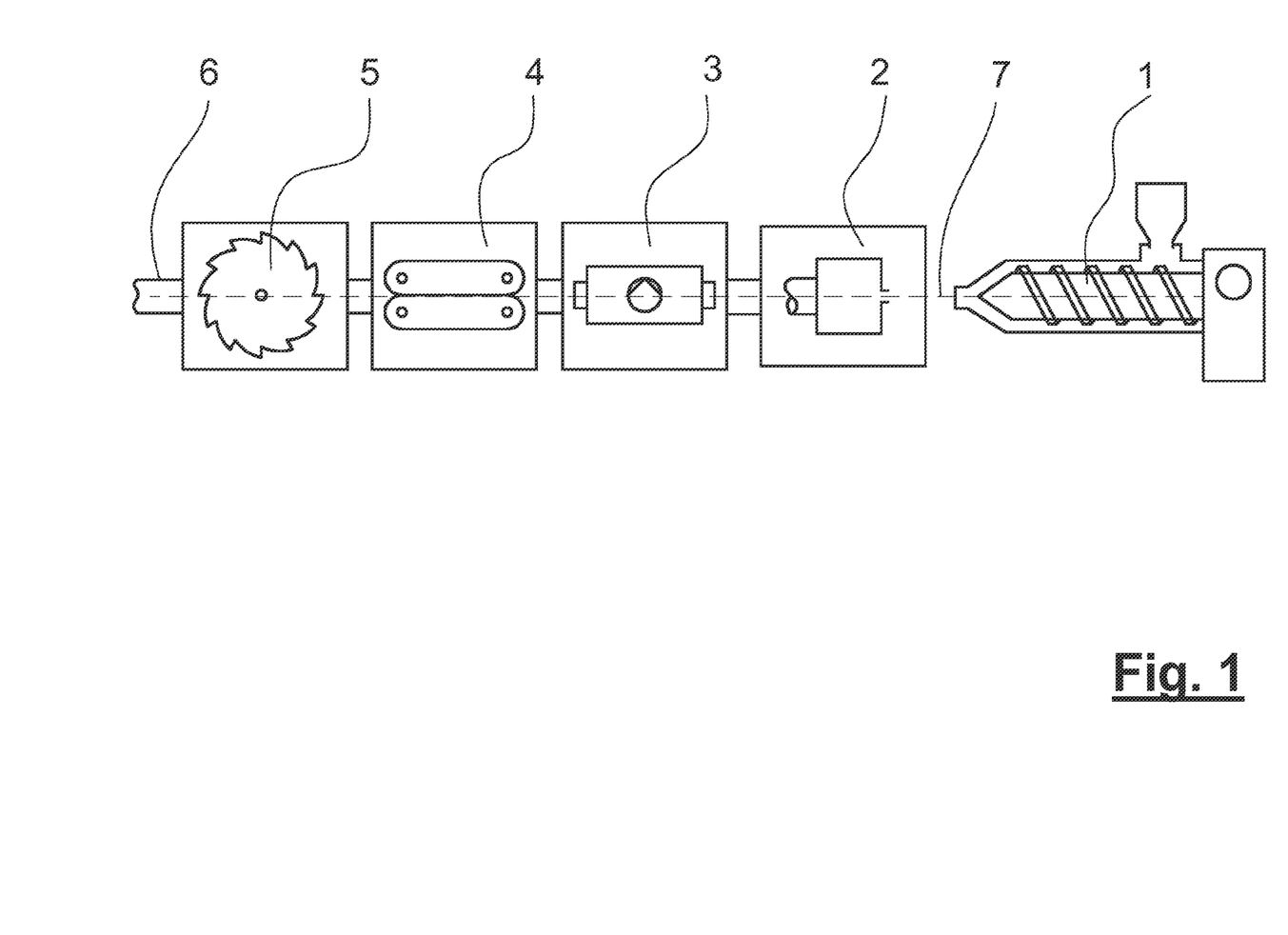
FIG. 1 shows a typical extrusion line.

FIG. 1 shows an extrusion line of the kind that is used for profile extrusion, whether for the production of window profiles or pipes. It shows an extruder 1, in which plastic is melted and conveyed continuously for shaping into the extrusion die 2. This is followed by a sizing and cooling station 3, and, depending on the profile, additional cooling stations may be used. The cooling stations are followed by a withdrawal device 4. In order to trim the continuous profiles 6 to the desired length, a separating device 5 is arranged downstream. The extrusion axis is referred to by reference numeral 7.

Figure 2:
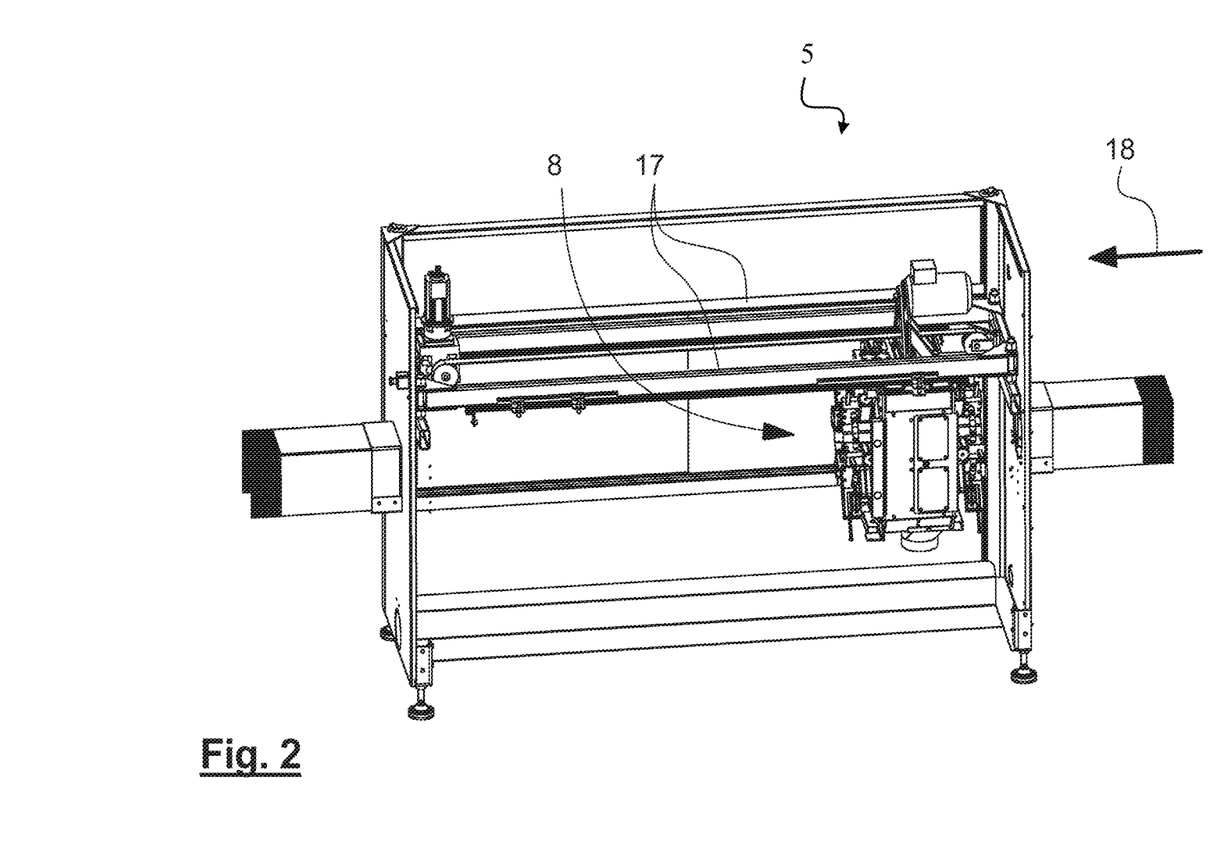
FIG. 2 shows the unit comprising the separating device.

FIG. 2 shows the unit comprising the separating device 5 from FIG. 1. The separating unit 8 is taken along in the extrusion direction 18 via the traversing rails 17 during the separating process. After the separating process, it is reset to the initial position counter to the extrusion direction 18. The cutting devices (e.g., the cutting tool 9A and cutting tool 9B or cutting tool 9C) are arranged on the separating unit 8.

Figure 3:
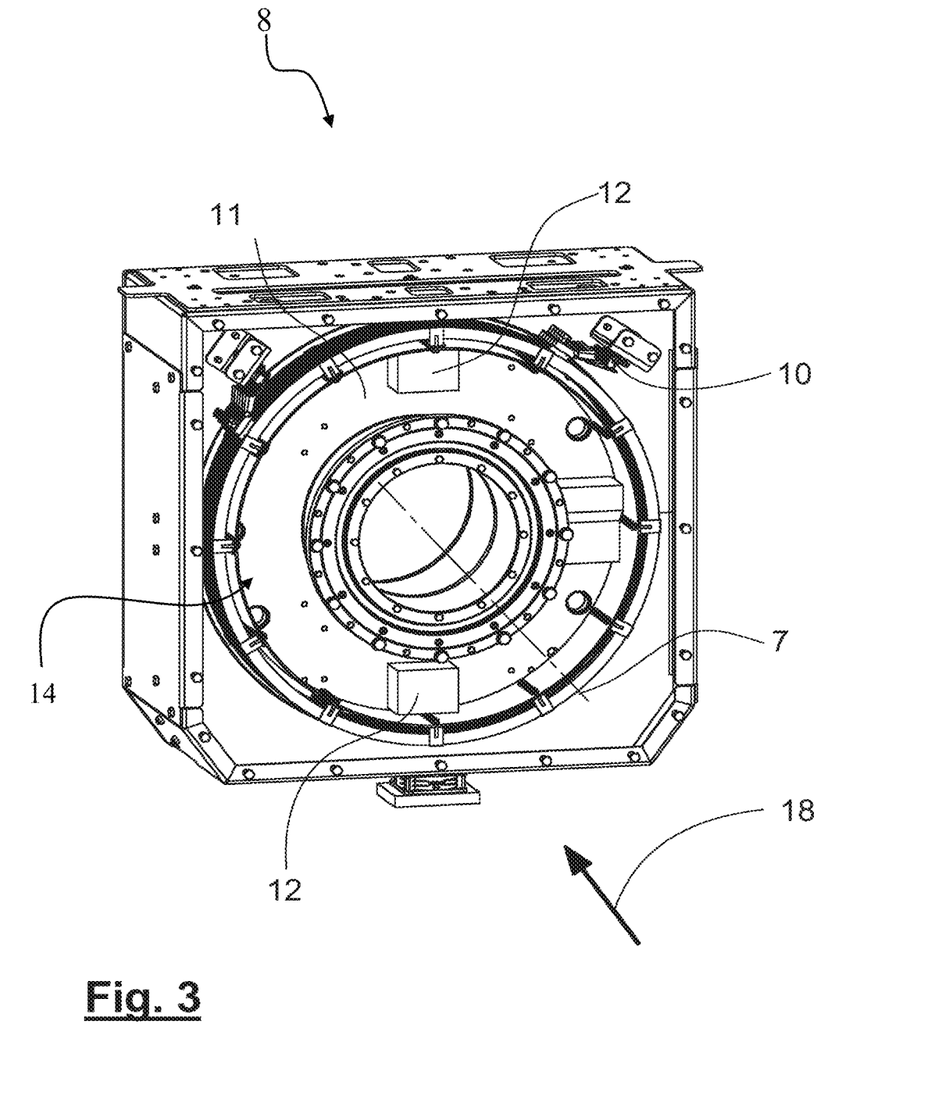
FIG. 3 shows the separating unit.

One side of the separating unit 8 is shown in FIG. 3. The rotating receiving unit 11 has a surface 14 which faces the extruder 1 in respect of the extrusion direction 18. All the energy supply units are mounted on this surface 14. The energy required for moving the cutting tools 9A, 9B, or 9C is ensured by means of electric suppliers 12 arranged at a number of locations. The electric suppliers 12, in turn, are supplied with energy via the slip rings 10.

Figure 4:
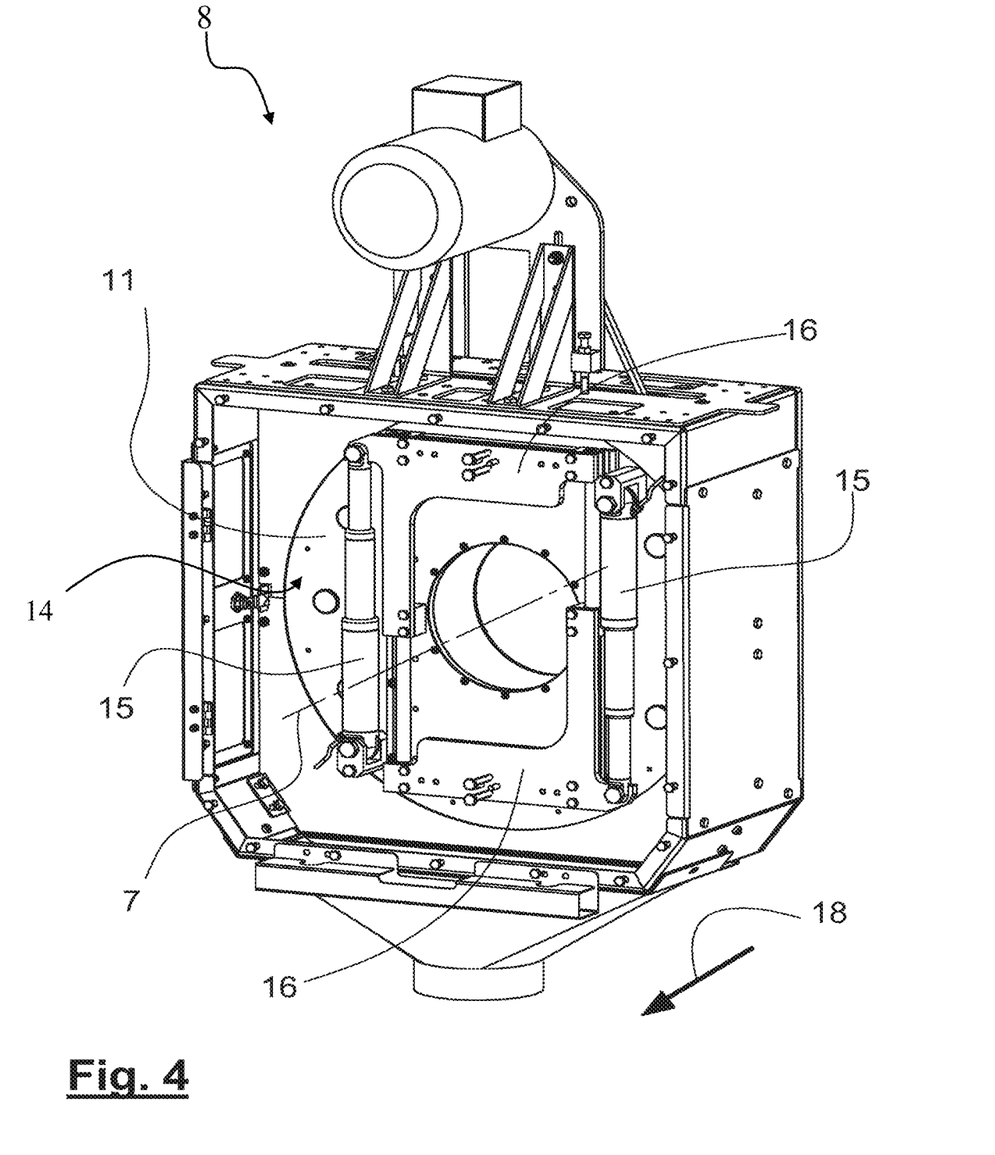
FIG. 4 shows a view of one side of the separating unit.
Figure 5:
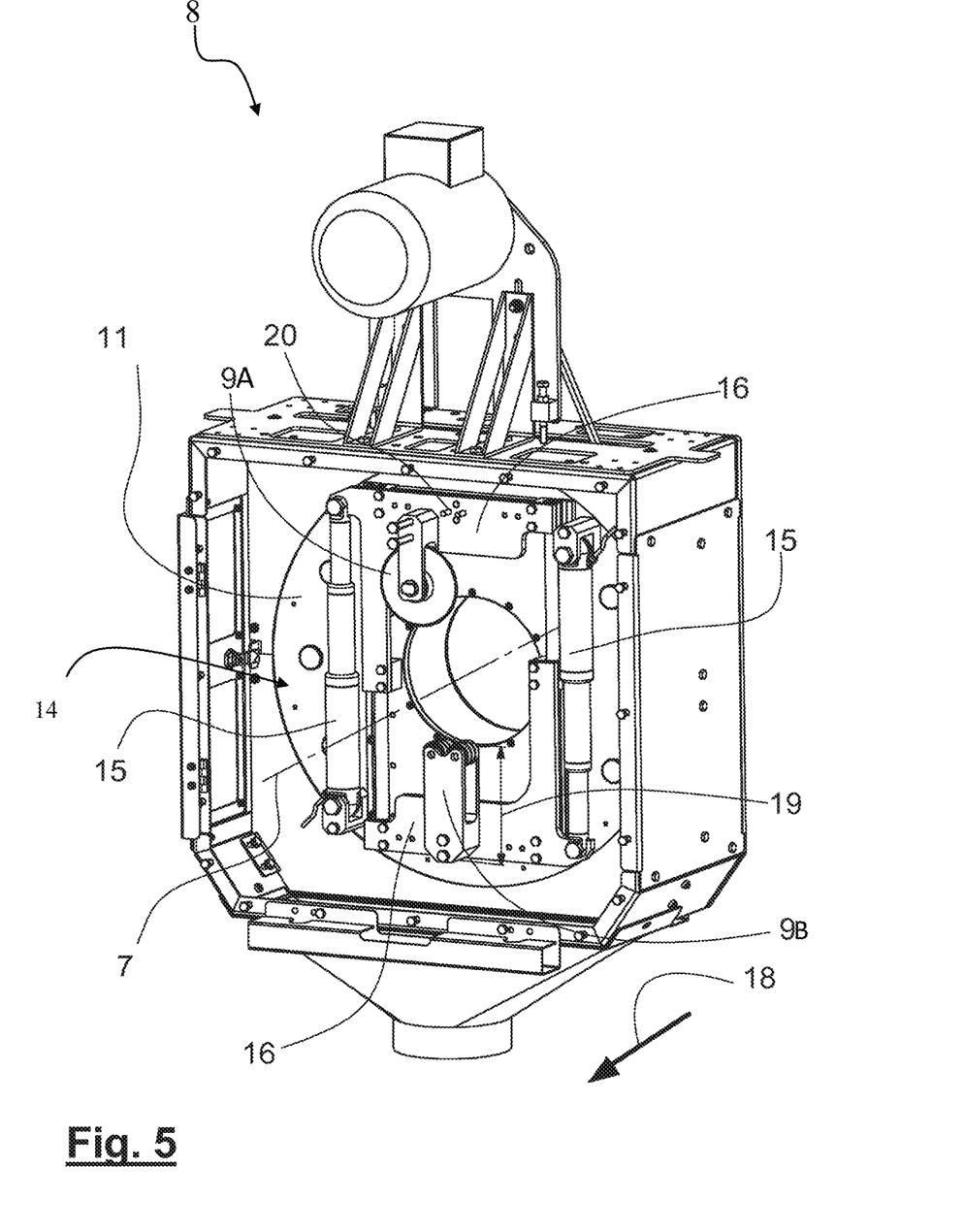
FIG. 5 shows an enlarged segment of FIG. 4.
Figure 6:
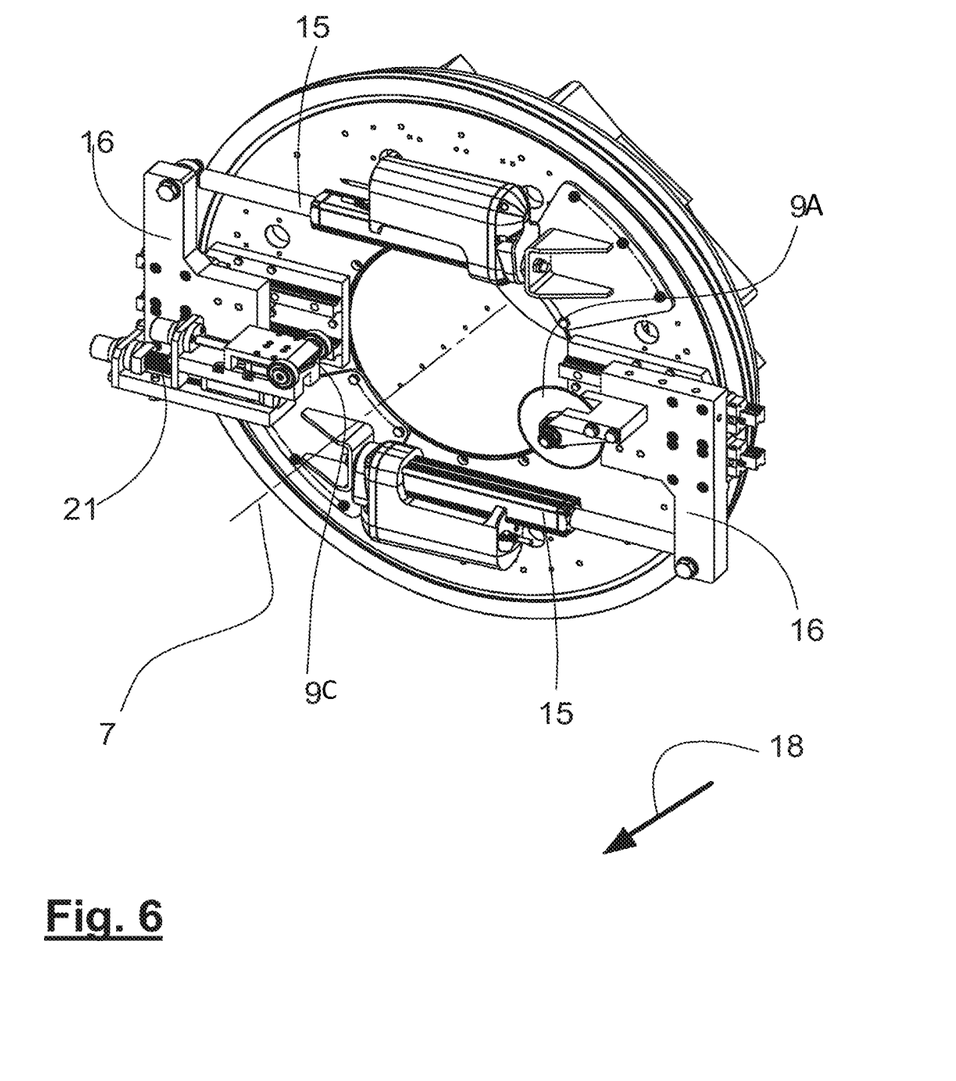
FIG. 6 shows a first version with a spring element.

FIG. 4 shows the opposite side of the rotating receiving unit 11. Arranged on this surface 13 are linear drives 15, by means of which the carriers 16 for the cutting tool 9A for separation and the tools 9B or 9C are moved perpendicularly to the extrusion axis 7. By way of example, two linear drives 15 and two carriers 16 are illustrated here. The two drives can be moved separately from one another. This has the advantage that a tool 9B comprising a roller combination 9B or a tool 9C comprising a tip for chamfering the profile can be mounted on one carrier 16, and a cutting tool 9A comprising a blade for separation can be mounted on the other carrier 16 (as shown in the embodiments of FIG. 5 or 6, discussed below). The tool for separation must be moved further in the direction of the extrusion axis 7 than the tool for chamfering.

FIG. 5 shows an embodiment of FIG. 4 with a cutting tool 9A comprising a blade and a tool 9B comprising a roller combination mounted. Here too, linear drives 15 for the carriers 16 can be seen. A rotating cutting blade for severing the pipe is provided as cutting tool 9A on the upper carrier 16 and is reproduced in a kind of exploded illustration because it is not yet fully mounted. Mounted on the lower carrier 16 is a roller combination, which is provided as tool 9C, which acts as an abutment and counteracts the occurring separating pressure of the cutting blade. It acts like a smoothing device, which smooths any bead which is formed during chipless separation or prevents sagging in the case of relatively thin pipes.

FIG. 6 shows an embodiment of FIG. 4 with a cutting tool 9A comprising a blade and a tool 9C comprising a tip for chamfering mounted on the carriers 16.

The carriers 16 and the tools 9A, 9B, or 9C have a positioning aid 20, whereby assembly is simplified. In addition, the tools 9A, 9B, or 9C are constructed in such a way that the total length 19 of all the tools that can be used is identical. This has the advantage that it is not necessary to move the carrier 16 when changing a tool for the same pipe diameter since the external clearance of the tool with respect to the outside diameter of the pipe remains unchanged. In addition, the tools can be provided with a tool recognition system. The machine controller can then recognize whether unsuitable tools are being mounted for the separating process envisaged and can respond accordingly with warning messages.

FIG. 6 shows, by way of example, the use of a stack of diaphragm springs 21, which make it possible for the complete unit to yield at a relatively high load, thereby avoiding damage to the tool. It is possible to see part of the separating unit 8 with the linear drives 15 arranged on the receiving unit, and the carriers 16. The view is rotated through 90° relative to FIGS. 4 and 5. Mounted on the right-hand carrier 16 shown in the view, as in FIG. 5, is a rotating separating blade provided as cutting tool 9A, which can be moved toward and away from the extrusion axis 7 by means of the linear drive 15.

Irrespective of this, a tool 9C, which is equipped with a tip for chamfering and is mounted on the left-hand carrier 16, can likewise be moved toward and away from the extrusion axis 7 by means of the linear drive 15. In addition, the tool 9C for chamfering is capable of yielding in the case of an overload by virtue of a spring element 21, in this case an arrangement of a plurality of diaphragm springs. This means sliding resiliently away from the occurring load, away from the extrusion axis, radially with respect to the extrusion axis, depending on the spring stress. The force above which yielding is to take place can thus be determined by means of the number of diaphragm springs.

However, other components acting as spring elements, even a resilient rotary motion during which the unit is pivoted out of the radial axis, are also conceivable.

Figure 7:
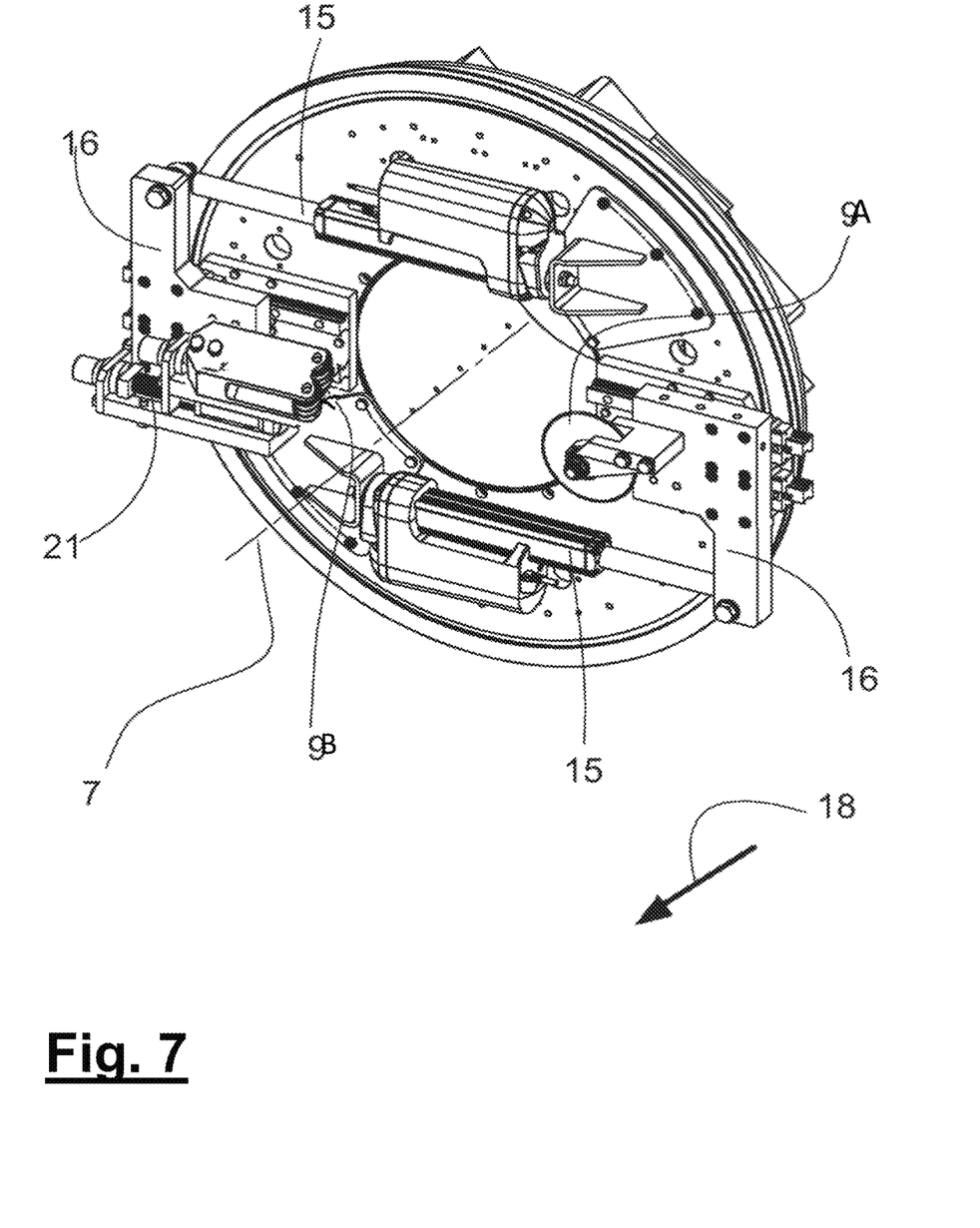
FIG. 7 shows a second version with a spring element.

FIG. 7 shows another embodiment of FIG. 4. FIG. 7 differs from FIG. 6 by having a tool that is a roller combination 9B mounted on a carrier 16 via a spring element 21.

LIST OF REFERENCE SIGNS

1 extruder
2 extrusion die
3 sizing and cooling tank
4 withdrawal device
5 separating device
6 profile
7 extrusion axis
8 separating unit
9 cutting tool
10 slip ring
11 rotating receiving unit
12 electric component
13 surface of 11 for mounting 9
14 surface of 11 for energy transfer
15 electromechanical unit, linear drive
16 carrier for 9
17 traversing rail for 8
18 extrusion direction
19 total length of 9
20 positioning aid for 9
21 spring element

The invention claimed is:

1. A separating device for cutting an extruded pipe to length, the separating device comprising:
a separator comprising a rotating receiver that is configured to be rotated about an extrusion axis of the extruded pipe, the rotating receiver being rotatably mounted in the separator;
cutting tools arranged on the rotating receiver, the cutting tools being configured to perform the cutting of the extruded pipe, the cutting tools being configured to move in accordance with received energy;
an electromechanical drive that is configured to move a carrier, wherein a first cutting tool of the cutting tools, which is a tool comprising a tip for chamfering, is arranged on the carrier, and wherein the electromechanical drive and the carrier are arranged on the rotating receiver; and a slip ring operatively connected to a moving part of the rotating receiver, the slip ring being operatively coupled to an energy supplier arranged on the rotating receiver, wherein the slip ring is configured to transmit energy and control commands to the electromechanical drive and the energy supplier, wherein the electromechanical drive, the carrier, or the first cutting tool is operatively connected to a spring element, which is configured to develop a spring action, in such a way that it is possible to yield to a force counter to a separating force by sliding resiliently away from an occurring load, away from an extrusion axis, radially with respect to the extrusion axis, upon the force counter to the separating force being greater than a required separating force for cutting the extruded pipe.

2. The separating device as claimed in claim 1, wherein the electromechanical drive for moving the first cutting tool is a linear drive.

3. The separating device as claimed in claim 1, wherein the electromechanical drive for moving the first cutting tool is a motor-driven spindle.

4. The separating device as claimed in claim 1,
wherein the rotating receiver has two surfaces,
wherein the cutting tools are arranged on only a first surface of the two surfaces, and
wherein the entire power supply takes place via a second surface of the two surfaces on which none of the cutting tools are mounted.

5. A method for operating the separating device as claimed in claim 1, the method comprising:
transferring the energy to the energy supplier on the moving part via the slip ring,
transferring the energy to the electromechanical drive via the energy supplier, and
transmitting control commands to the electromechanical drive via electric components, the electric components configured to receive signals in a contactless manner.

6. The method as claimed in claim 5, wherein the force and speed of movement of the electromechanical drive are largely independent of the operating temperature.

7. The method as claimed in claim 5, the method comprising moving the first cutting tool toward the extrusion axis, wherein the movement comprises a radial movement that is stopped, reversed and resumed, wherein the stop-reverse-resume takes place within a certain time period less than five seconds.

8. The method of claim 5, wherein the method further comprises storing energy in electric components, and discharging the energy again in a case of peak loads.

9. The separating device as claimed in claim 1, wherein no hydraulic unit is arranged on the rotating receiver.

10. The separating device as claimed in claim 1, further comprising a coupling unit configured to identify a particular tool of the cutting tools based on a mounting of the particular tool on the separating device.

11. The device of claim 1, wherein the spring element comprises diaphragm springs.

12. The device of claim 1, wherein the separating force is imparted by the first cutting tool on the extruded pipe and the force counter to the separating force is imparted on the first cutting tool by the extruded pipe.

13. A device for an extrusion line, the device for cutting an extruded plastic pipe to length, the device comprising a separating unit that comprises:
a rotating receiver that is configured to be rotated about an extrusion axis of the extruded pipe, the rotating receiver being rotatably mounted in the separating unit;
a first linear electromechanical drive arranged on a first surface of the rotating receiver;
a first carrier operatively coupled to the linear electromechanical drive and moveably arranged on the first surface of the rotating receiver;
a tool comprising a roller combination or a chamfering tool operatively coupled to the first carrier using a spring element, the tool being configured to smooth a bead that is formed during chipless separation, prevent sagging, or chamfer a profile of the extruded pipe;
a second linear electromechanical drive arranged on the first surface of the rotating receiver;
a second carrier operatively coupled to the second linear electromechanical drive and moveably arranged on the first surface of the rotating receiver; and
a cutting tool comprising a cutting blade operatively coupled to the second carrier,
wherein the first linear electromechanical drive is configured to controllably move the first carrier in order to move the tool towards and away from the extrusion axis in a manner perpendicular to the extrusion axis,
wherein the spring element is configured to develop a spring action that is configured to yield to a force counter to a separating force by sliding resiliently away from an occurring load, away from an extrusion axis, radially with respect to the extrusion axis, wherein the separating force occurs between the tool and the extruded plastic pipe during the cutting, upon the force counter to the separating force being greater than a required separating force for cutting the extruded pipe, and
wherein the second linear electromechanical drive is configured to controllably move the second carrier in order to move the rotating cutting blade towards and away from the extrusion axis in the manner perpendicular to the extrusion axis.

14. The device of claim 13,
wherein the device further comprises rails extending parallel to the extrusion axis,
wherein the separating unit is movable along the extrusion axis via the rails, and
wherein the separating unit further configures a drive configured to operably rotate the rotating receiver.

15. The device of claim 13,
wherein the second linear electromechanical drive is configured to controllably move the cutting blade separately from the movement of the first cutting tool.

* * * * *